(12) United States Patent
Hufnagel et al.

(10) Patent No.: US 11,722,076 B2
(45) Date of Patent: Aug. 8, 2023

(54) DRIVE SYSTEM AND METHOD FOR OPERATING A DRIVE SYSTEM

(71) Applicant: SEW-EURODRIVE GMBH & CO. KG, Bruchsal (DE)

(72) Inventors: Timo Hufnagel, Eppingen (DE); Hans Jürgen Kollar, Bruchsal (DE); Christopher Reichert, Karlsdorf-Neuthard (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 163 days.

(21) Appl. No.: 17/424,655

(22) PCT Filed: Jan. 13, 2020

(86) PCT No.: PCT/EP2020/025010
§ 371 (c)(1),
(2) Date: Jul. 21, 2021

(87) PCT Pub. No.: WO2020/151914
PCT Pub. Date: Jul. 30, 2020

(65) Prior Publication Data
US 2022/0131484 A1    Apr. 28, 2022

(30) Foreign Application Priority Data
Jan. 21, 2019 (DE) .................. 102019000330.6

(51) Int. Cl.
*H02P 3/18* (2006.01)
*H02P 3/04* (2006.01)
*H02M 7/217* (2006.01)

(52) U.S. Cl.
CPC ............. *H02P 3/18* (2013.01); *H02P 3/04* (2013.01); *H02M 7/217* (2013.01)

(58) Field of Classification Search
CPC .. H02P 3/04; H02P 3/18; H02P 27/08; H02M 7/02
See application file for complete search history.

(56) References Cited

U.S. PATENT DOCUMENTS

| | | | |
|---|---|---|---|
| 6,291,951 B1 * | 9/2001 | Baulier | H02P 3/04 318/368 |
| 8,847,523 B2 * | 9/2014 | Bringold | H02P 3/04 318/362 |
| 2011/0108386 A1 * | 5/2011 | Nurnberg | H02P 3/16 198/323 |

FOREIGN PATENT DOCUMENTS

| | | | |
|---|---|---|---|
| DE | 102007040423 A1 * | 2/2009 | ........ H02P 29/0055 |
| DE | 102012008547 A1 * | 12/2012 | ........... B60T 13/748 |

(Continued)

OTHER PUBLICATIONS

International Search Report issued in corresponding International Application No. PCT/EP2020/025010, dated May 6, 2020, pp. 1-2, English Translation.

*Primary Examiner* — Thai T Dinh
(74) *Attorney, Agent, or Firm* — Carter, Deluca & Farrell LLP

(57) ABSTRACT

In a drive system and method for operating a drive system, in which the drive systems includes an electromagnetically operable brake, an electric motor, e.g., a three-phase motor, and an electronic circuit, the brake has an energizable coil, e.g., a brake coil, the electronic circuit has a rectifier, an upper controllable semiconductor switch, a freewheeling diode, and a varistor, a direct voltage provided by a rectifier is able to be made available by closing or by a pulse-width-modulated actuation of an upper controllable semiconductor switch of the coil, and by opening the upper controllable semiconductor switch, a current driven by the coil in the de-excitation of the coil is freewheeling and/or flowing (Continued)

through the freewheeling diode and the varistor or through a component connected in parallel with the varistor.

24 Claims, 1 Drawing Sheet

(56) References Cited

FOREIGN PATENT DOCUMENTS

| | | | | |
|---|---|---|---|---|
| DE | 102012008547 A1 | 12/2012 | | |
| EP | 2747287 A1 * | 6/2014 | ............. | H03K 17/94 |
| EP | 2747287 A1 | 6/2014 | | |
| JP | 2003130096 A * | 5/2003 | | |

* cited by examiner

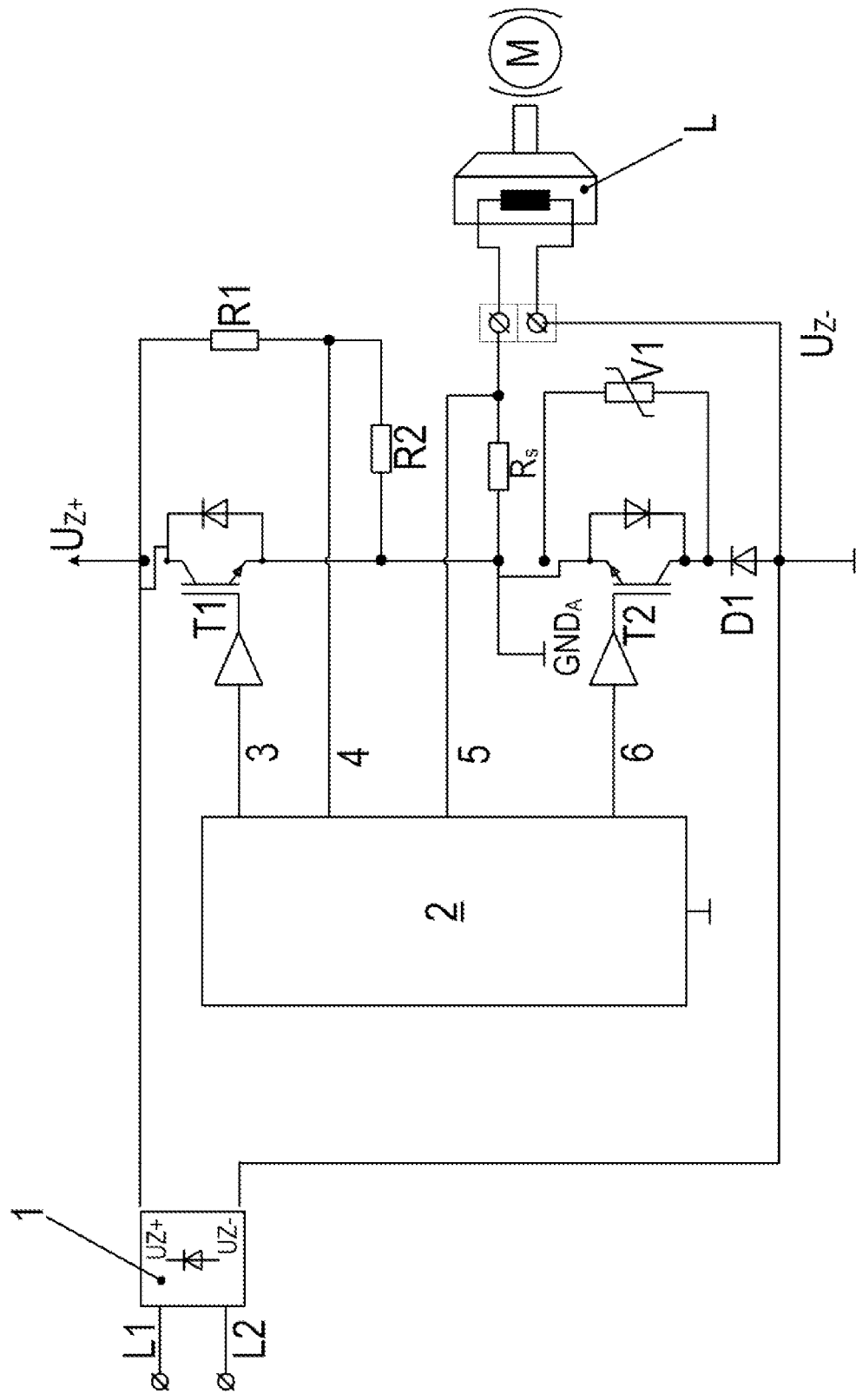

DRIVE SYSTEM AND METHOD FOR OPERATING A DRIVE SYSTEM

FIELD OF THE INVENTION

The present invention relates to a drive system and to a method for operating a drive system.

BACKGROUND INFORMATION

In certain conventional systems, a brake coil of an electromagnetically operable brake is actuated by a direct current in order to release or apply the brake.

SUMMARY

Example embodiments of the present invention provide for an efficient mode of operation of the brake.

According to an example embodiment of the present invention, a drive system includes an electromagnetically operable brake, an electric motor, e.g., a three-phase motor, and an electronic circuit. The brake includes an energizable coil, e.g., a brake coil, and the electronic circuit includes a rectifier, an upper controllable semiconductor switch, a freewheeling diode, and a varistor. A direct voltage provided by a rectifier is able to be made available by closing or by a pulse-width modulated actuation of an upper controllable semiconductor switch of the coil, and by opening the upper controllable semiconductor switch, a current driven by the coil in a de-excitation of the coil is freewheeling and/or flowing through the freewheeling diode and the varistor or through a component connected in parallel with the varistor.

This has the advantage that the brake is able to be operated in an effective manner. This is because, due to the power supply controlled via the upper semiconductor switch, the brake can be monitored for wear under defined conditions since the voltage initially supplied to the brake is controllable to a voltage value. In addition, a rapid de-excitation of the brake is possible by using a varistor, that is to say, a component which initially exhibits high resistance at low voltages and then becomes low-resistive at a high voltages. In addition, a component, which may be arranged as a semiconductor switch and thus is controllable to an even lower resistance range, is possible in parallel with the varistor. With the aid of a closed semiconductor switch, the varistor is substantially able to be short-circuited.

According to example embodiments, the coil together with a shunt resistor and the upper controllable semiconductor switch forms a series circuit, which is supplied from the direct voltage. This has the advantage that the current is readily acquirable. In addition, it is possible to set the shunt resistor to a zero potential so that the control electronics can likewise be set to the zero potential, which means that no galvanic separation is necessary between the shunt resistor and the control electronics.

According to example embodiments, the freewheeling diode together with the varistor forms a series circuit, which is connected in parallel with the series circuit formed by the coil and the shunt resistor. This offers the advantage that the current freewheeling in a de-excitation is routed via the diode and the varistor. As a result, the current can be routed along this path only during the de-excitation, but not during an energization of the coil.

According to example embodiments, the component is a lower controllable semiconductor switch, e.g., the current driven by the coil during its de-excitation is fully or substantially flowing through the lower semiconductor switch when the lower controllable semiconductor is closed, i.e., the varistor, for example, remaining highly resistive. This offers the advantage of allowing for a rapid de-excitation of the coil.

According to example embodiments, the freewheeling diode is connected to the lower potential of the direct voltage via a first connection. This is considered advantageous insofar as the lower semiconductor switch is protected via the freewheeling diode. In addition, a further freewheeling diode is situated between the collector and emitter of the respective semiconductor switch so that the buildup of high voltages during the switching of the semiconductor switch is avoided.

According to example embodiments, the shunt resistor is connected via a first connection both to the lower semiconductor switch and to the upper semiconductor switch. This has the advantage that the shunt resistor is connected to the zero potential so that no galvanic decoupling is required between the control electronics and the shunt resistor.

According to example embodiments, a control electronics generates the actuation signal for the upper semiconductor switch as well as the actuation signal for the lower semiconductor switch and acquires the direct voltage and also the voltage dropping at the shunt resistor, e.g., as current flowing through the coil, e.g., the voltage between the upper potential of the direct voltage and a zero potential is acquired in down-divided form with the aid of a voltage splitter which, for example, includes two resistors. This offers the advantage that the control electronics controls the operation of the brake. When energizing or de-exciting the coil, the respective semiconductor switch is operated. In particular, it is also possible to carry out a pulse-width-modulated actuation of the upper semiconductor switch. Moreover, the lower semiconductor switch is actuated only if corresponding parameters for a rapid de-excitation are specified in the initial operation of the drive system.

According to example embodiments, the control electronics has a first controller, which controls the voltage, acquired directly or in down-divided form at the coil, to a voltage value, e.g., a setpoint value, in that the first controller has as the controlled variable the pulse-width modulation ratio of the pulse-width-modulated actuation signal of the upper semiconductor switch. This is considered advantageous insofar as the voltage value is kept constant for a first period of time so that a diagnosis of the brake under defined marginal conditions can be carried out during this time period. In the process, the current characteristic is able to be monitored and thus a sudden drop in the current characteristic, induced by a release movement of the armature disk and thus by the associated inductivity change, is detectable. The associated current value may be used as a starting value for a subsequent control.

According to example embodiments, the control electronics supplies a voltage value to the coil in that a pulse-width modulation ratio of the actuation signal for the upper semiconductor switch is determined as a function of the acquired, down-divided voltage, e.g., between the upper potential of the direct voltage of the rectifier and the zero potential, the voltage thus being controlled, for example. This has the advantage that the voltage value is provided in a controlled manner. An efficient operation of the brake is provided in the process because the wear of the brake pads is able to be determined and the brake operated accordingly.

According to example embodiments, the control electronics has a second controller, which controls the current, acquired with the aid of the shunt resistor, to a setpoint current in that the second controller has the pulse-width modulation ratio of the pulse-width-modulated actuation signal of the upper semiconductor switch as a controlled variable. This is considered advantageous insofar as a current-controlled operation is possible and thus an energy-saving and therefore efficient continuous operation.

According to example embodiments, the control electronics has a changeover device which particularly activates either the first or the second controller and deactivates the respective other. This offers the advantage of providing a diagnosis of the state of the brake pad on the one hand and an efficient continuous operation on the other hand.

According to example embodiments, the control electronics includes a device for determining the wear of a brake pad of a brake pad supporting plate of the brake, to which the characteristic of the current acquired with the aid of the shunt resistor is conveyed and which has a device for determining a sudden change in the characteristic and the current amount when the sudden change occurs. This is considered advantageous insofar as the wear of the brake pad is able to be determined in a simple and reliable, i.e., efficient, manner.

According to example embodiments, a connection of the shunt resistor is electrically connected to the zero potential, the control electronics, for example, being supplied from a supply voltage whose lower potential is the zero potential, e.g., such that the voltage dropping at the shunt resistor is conveyed directly to the control electronics, that is to say, especially without a galvanic separation, e.g., in order to acquire the current flowing through the coil. This has the advantage of not requiring a galvanic separation.

According to an example embodiment of the present invention, in a method for operating a drive system that has an electromagnetically operable brake which includes a coil, in a first method step, the voltage applied at the coil is controlled to a voltage value, e.g., in that a pulse-width modulation ratio is determined as a function of a voltage acquired in a down-divided manner, e.g., between an upper potential of the direct voltage supplied by a rectifier and a zero potential, for the particular pulse-width-modulated actuation signal that is conveyed to an upper semiconductor switch so that the voltage applied at the coil reaches the voltage value. In a second method step following the first method step, the current flowing through the coil is acquired, e.g., with the aid of a shunt resistor, and controlled to a setpoint value, e.g., by determining a pulse-width modulation ratio for the particular pulse-width-modulated actuation signal that is conveyed to an upper semiconductor switch so that the current flowing through the coil is controlled to the setpoint value.

This has the advantage that a voltage value of the coil is initially provided in a controlled manner and a defined voltage of the coil is therefore available so that a precise determination of the current characteristic is possible and thus a precise determination of a sudden drop.

According to example embodiments, prior to the first method step, the voltage supplied by the rectifier is made available to the coil for a period of time (T1). This is considered advantageous insofar as the coil current is able to be built up as rapidly as possible in the beginning.

According to example embodiments, the characteristic of the current flowing through the coil is acquired during the first method step, and the associated value of the current flowing through the coil during a sudden change or drop in the time characteristic is determined. This has the advantage that the sudden drop of the current characteristic when the armature disk is raised is readily determined.

According to example embodiments, the current is acquired with the aid of a shunt resistor, which lies at the same potential, e.g., a zero potential, as the signal electronics of the drive system carrying out the control or regulation. This is considered advantageous insofar as no galvanic separation is required.

Further features and aspects of example embodiments of the present invention are described in greater detail below with reference to the appended schematic FIGURE.

BRIEF DESCRIPTION OF THE DRAWING

FIG. 1 is a schematic circuit diagram of a brake actuation of a drive system according to an example embodiment of the present invention.

DETAILED DESCRIPTION

As schematically illustrated in FIG. 1, the drive system has an electric motor M and an electromagnetically operable brake, the brake torque generated by the brake being conveyed to the rotor of the electric motor.

The brake includes a coil having inductivity L which in an energization attracts an armature disk counter to the spring force generated by a spring element so that a brake pad support plate, which is connected to the rotor in a torsionally fixed but axially displaceable manner, is able to disengage from a brake surface. The brake surface is firmly connected to the coil. The armature disk is connected to the coil in a torsionally fixed but axially displaceable manner.

In the nonenergized state of the coil, the spring element pushes the armature disk against the brake pad support plate, which is thereby pressed onto the brake surface. The brake surface is situated on the side of the brake pad support plate facing away from the armature disk.

The coil thus has to be energized in order to release the brake, whereas the coil must be deenergized, i.e., de-excited, to apply the brake. The faster the de-excitation is achieved, i.e., the dissipation of the current flowing through the coil, the faster the brake will be applied.

The brake actuation has a rectifier 1, which is supplied from two phases of a three-phase voltage network (L1, L2).

Thus, rectifier 1 supplies at its DC-voltage-side connection a direct voltage, which may be called an intermediate circuit voltage and has an upper potential Uz+ as well as a lower potential Uz−. A series connection, which includes an upper semiconductor switch T1 and a lower semiconductor switch T2 and a diode D1, is supplied from the direct voltage.

Upper semiconductor switch T1 is supplied between upper potential Uz+ of the direct voltage and electrical ground, i.e., zero potential.

Lower semiconductor switch T2 is situated in series with diode D1, this series connection being supplied between lower potential Uz− of the direct voltage and electrical ground, i.e., zero potential.

Inductivity L of the coil is supplied from the voltage present between lower potential Uz− of the direct voltage and electrical ground, i.e., zero potential, and a shunt resistor Rs is situated in the supply line of inductivity L, which is connected via its first connection to electrical ground, e.g., zero potential, and to inductivity L via the other connection.

A freewheeling diode is connected in parallel with each of the two semiconductor switches (T1, T2).

A control electronics 2 arranged as a signal electronics generates the actuation signals (3, 6) for the two semiconductor switches T1 and T2.

Via a voltage divider, which is formed by a series connection that includes a first resistor R1 and a second resistor R2, the down-divided voltage present between upper potential Uz+ and electrical ground is conveyed to control electronics 2. The down-divided voltage is acquired.

Control electronics 2 generates an actuation signal 3 for upper semiconductor switch T1, which is pulse-width-modulated such that it supplies a voltage value to the coil for energizing the coil, the voltage value being smaller than the amount of the voltage between upper potential Uz+ and electrical ground.

This voltage value is 200 Volt, for instance, regardless of the direct voltage actually made available by the rectifier. In this manner, an operation in a broad voltage range is possible in different three-phase current networks. The voltage value always remains the same, however. This allows for a diagnosis of the brake when initiating the release operation. This is because after the brake is activated, i.e., the voltage value is supplied, the characteristic of the current acquired with the aid of the shunt resistor is monitored. As soon as the armature disk starts to move, the characteristic exhibits a sudden change or brief drop because the inductivity of the coil changes in the process.

Since the voltage value can be specified very precisely, the characteristic is able to be determined in the most precise manner possible, e.g., the current value of the abrupt change, and on that basis, the value of the air gap to be overcome by the armature disk, which represents a measure of the wear of the brake pads of the brake pad support plate.

The most precise generation of the voltage value is therefore important for the most precise wear determination.

A varistor V1 is connected in parallel with lower semiconductor switch T2. When upper semiconductor switch T1 is opened for the de-excitation, the current of the coil freewheels via varistor V1. The field generated by the coil is therefore decays and the spring element pushes the armature disk onto the brake pad support plate so that it is pressed against the brake surface.

However, if a faster de-excitation of the coil is specified, the control electronics actuates lower semiconductor switch T2 so that it closes and the current of the coil thus flows via the transistor and the magnetic field consequently decays.

Thus, if upper semiconductor switch T1 is opened, lower semiconductor switch T2 may remain open for the de-excitation of the coil or, alternatively, be closed for the faster de-excitation.

Since shunt resistor Rs is connected to ground potential via its first connection, control electronics 2 is able to acquire the voltage dropping at the shunt resistor and can thus determine the current flowing through the coil without a galvanic separation.

As described earlier, upper semiconductor switch T1 is closed for the release of the coil, but lower semiconductor switch T2 is opened beforehand in all instances.

In a first time segment, control electronics 2 acquires the down-divided voltage and a pulse-width modulation ratio is determined and a correspondingly modulated actuation signal is conveyed to upper semiconductor switch T1. A very precise control of the voltage value is therefore possible. Thus, if a variable voltage or a higher direct voltage is supplied by the rectifier, then the voltage value is supplied in a controlled fashion with the aid of the adapted pulse-width modulation ratio.

In a second time segment following the first time segment, a current control is performed. In the process, a linear controller, e.g., a PI controller, controls the current acquired with the aid of shunt resistor Rs to a setpoint value by using the pulse-width modulation ratio as the set value once again, thereby providing a corresponding voltage to the coil.

During the first time segment, the described diagnosis, i.e., the monitoring of the current characteristic and the current intensity in the abrupt change in the current characteristic, that is to say, the raising of the armature disk, is carried out so that the wear of the brake is able to be determined.

Prior to the described first time segment, upper semiconductor switch T1 may be permanently closed during the release, i.e., closed without interruption, for a period of time to begin with. The highest available voltage is therefore effective in order to induce the steepest possible current increase. The time period is selected to be so short that the sudden change in the current characteristic cannot be reached. Afterwards, the voltage value is provided for the first time segment by the described current control and the current regulation is carried out again in the second time segment.

LIST OF REFERENCE CHARACTERS 1 rectifier
2 control electronics
3 actuation signal for the upper semiconductor switch
4 down-divided intermediate circuit voltage
5 voltage at the shunt resistor
6 actuation signal for the lower semiconductor switch
Rs shunt resistor
R1 first resistor
R2 second resistor
T1 upper semiconductor switch
T2 lower semiconductor switch
D1 diode
V1 varistor
L Inductivity of the brake coil
Uz+ upper potential of the intermediate circuit voltage
Uz− lower potential of the intermediate circuit voltage
M electric motor

The invention claimed is:

1. A drive system, comprising:
an electromagnetically operable brake including an energizable coil;
an electric motor; and
an electronic circuit including a rectifier, an upper controllable semiconductor switch, a freewheeling diode, and a varistor;
wherein a direct voltage provided by a rectifier is able to be made available by closing or by a pulse-width-modulated actuation of an upper controllable semiconductor switch of the coil, and opening the upper controllable semiconductor switch causes a current driven by the coil in a de-excitation of the coil to freewheel and/or flow through the freewheeling diode and the varistor or through a component connected in parallel with the varistor;
wherein the freewheeling diode and the varistor form a series circuit connected in parallel with a series circuit formed by the coil and a shunt resistor.

2. The drive system according to claim 1, wherein the electric motor is arranged as a three-phase motor.

3. The drive system according to claim 1, wherein the coil includes a brake coil.

4. The drive system according to claim 1, wherein the coil, the shunt resistor, and the upper controllable semiconductor switch form a series circuit that supplied from direct voltage.

5. The drive system according to claim 1, wherein the component includes a lower controllable semiconductor switch.

6. The drive system according to claim 5, wherein when closing the lower controllable semiconductor switch, current driven by the coil during de-excitation is fully or substantially flowing through the lower controllable semiconductor switch, and the varistor remains highly resistive.

7. The drive system according to claim 5, wherein the shunt resistor is connected by a first connection both to the lower controllable semiconductor switch and to the upper semiconductor switch.

8. The drive system according to claim 5, wherein a control electronics is adapted to generate an actuation signal for the upper controllable semiconductor switch and an actuation signal for the lower controllable semiconductor switch and to acquire a direct voltage and a voltage dropping at the shunt resistor as current flowing through the coil.

9. The drive system according to claim 8, wherein the control electronics includes a first controller adapted to control a voltage acquired directly at the coil or acquired in a down-divided manner to a voltage value and/or to a setpoint value, the first controller includes as a controlled variable the pulse-width modulation ratio of a pulse-width-modulated actuation signal of the upper controllable semiconductor switch.

10. The drive system according to claim 8, wherein a connection of the shunt resistor is electrically connected to a zero potential.

11. The drive system according to claim 10, wherein the control electronics is suppliable from a supply voltage having a lower potential as the zero potential.

12. The drive system according to claim 11, wherein a voltage dropping at the shunt resistor is conveyed directly to the control electronics and without a galvanic separation, in order to acquire current flowing through the coil.

13. The drive system according to claim 1, wherein the freewheeling diode is connected to a lower potential of a direct voltage via a first connection.

14. The drive system according to claim 1, wherein the control electronics is adapted to acquire in a down-divided manner a voltage between an upper potential of the direct voltage and a zero potential via a voltage splitter that includes two resistors.

15. A method for operating a drive system as recited in claim 1, comprising:
controlling a voltage applied at the coil to a voltage value, including determining a pulse-width modulation ratio as a function of a voltage acquired in a down-divided manner between an upper potential of a direct voltage supplied by the rectifier and a zero potential, for a particular pulse-width-modulated actuation signal that is conveyed to an upper controllable semiconductor switch, so that the voltage applied at the coil reaches the voltage value; and
after controlling the voltage applied at the coil to the voltage value, acquiring current flowing through the coil, via the shunt resistor, and controlling the current flowing through the coil to a setpoint value, by determining a pulse-width modulation ratio for the particular pulse-width-modulated actuation signal that is conveyed to the upper controllable semiconductor switch, so that the current flowing through the coil is controlled to the setpoint value.

16. The method according to claim 15, wherein prior to controlling the voltage applied at the coil to the voltage, making available the voltage supplied to the coil by the rectifier for a period of time.

17. The method according to claim 15, wherein the controlling of the voltage applied at the coil to the voltage value includes acquiring a characteristic of the current flowing through the coil, and determining an associated value of the current flowing through the coil in a sudden change or drop in a time characteristic.

18. The method according to claim 15, wherein the controlling is performed in accordance with current acquired via the shunt resistor being at the same potential and/or zero potential as a signal electronics of the drive system.

19. A drive system, comprising:
an electromagnetically operable brake including an energizable coil;
an electric motor; and
an electronic circuit including a rectifier, an upper controllable semiconductor switch, a freewheeling diode, and a varistor;
wherein a direct voltage provided by a rectifier is able to be made available by closing or by a pulse-width-modulated actuation of an upper controllable semiconductor switch of the coil, and opening the upper controllable semiconductor switch causes a current driven by the coil in a de-excitation of the coil to freewheel and/or flow through the freewheeling diode and the varistor or through a component connected in parallel with the varistor;
wherein the coil, a shunt resistor, and the upper controllable semiconductor switch form a series circuit that supplied from direct voltage; and
wherein the freewheeling diode and the varistor form a series circuit connected in parallel with a series circuit formed by the coil and the shunt resistor.

20. A drive system according to claim 8, comprising:
an electromagnetically operable brake including an energizable coil:
an electric motor; and
an electronic circuit including a rectifier, an upper controllable semiconductor switch, a freewheeling diode, and a varistor:
wherein a direct voltage provided by the rectifier is able to be made available by closing or by a pulse-width-modulated actuation of the upper controllable semiconductor switch of the coil, and opening the upper controllable semiconductor switch causes a current driven by the coil in a de-excitation of the coil to freewheel and/or flow through the freewheeling diode and the varistor or through a component connected in parallel with the varistor;
wherein the component includes a lower controllable semiconductor switch;
wherein a control electronics is adapted to generate an actuation signal for the upper controllable semiconductor switch and an actuation signal for the lower controllable semiconductor switch and to acquire a direct voltage and a voltage dropping at the shunt resistor as current flowing through the coil; and
wherein the control electronics is adapted to supply a voltage value to the coil in that a pulse-width modulation ratio of an actuation signal for the upper controllable semiconductor switch is determined as a function of a down-divided acquired voltage, between an upper potential of a direct voltage of the rectifier and a zero potential, to control the voltage.

21. A drive system, comprising:
an electromagnetically operable brake including an energizable coil:
an electric motor; and
an electronic circuit including a rectifier, an upper controllable semiconductor switch, a freewheeling diode, and a varistor:
wherein a direct voltage provided by the rectifier is able to be made available by closing or by a pulse-width-modulated actuation of the upper controllable semiconductor switch of the coil, and opening the upper controllable semiconductor switch causes a current driven by the coil in a de-excitation of the coil to freewheel and/or flow through the freewheeling diode and the varistor or through a component connected in parallel with the varistor;
wherein the component includes a lower controllable semiconductor switch;
wherein a control electronics is adapted to generate an actuation signal for the upper controllable semiconductor switch and an actuation signal for the lower controllable semiconductor switch and to acquire a direct voltage and a voltage dropping at a shunt resistor as current flowing through the coil;
wherein the control electronics includes a first controller adapted to control a voltage acquired directly at the coil or acquired in a down-divided manner to a voltage value and/or to a setpoint value, the first controller includes as a controlled variable the pulse-width modulation ratio of a pulse-width-modulated actuation signal of the upper controllable semiconductor switch; and
wherein the control electronics includes a second controller adapted to control a current acquired via the shunt resistor to a setpoint current in that the second controller has the pulse-width modulation ratio of the pulse-width-modulated actuation signal of the upper controllable semiconductor switch as a controlled variable.

22. The drive system according to claim 21, wherein the control electronics is adapted to activate either a first one of the first controller and the second controller.

23. The drive system according to claim 22, wherein the control electronics is adapted to deactivate a second one of the first controller and the second controller.

24. A drive system according to claim 8, comprising:
an electromagnetically operable brake including an energizable coil:
an electric motor; and
an electronic circuit including a rectifier, an upper controllable semiconductor switch, a freewheeling diode, and a varistor;
wherein a direct voltage provided by the rectifier is able to be made available by closing or by a pulse-width-modulated actuation of the upper controllable semiconductor switch of the coil, and opening the upper controllable semiconductor switch causes a current driven by the coil in a de-excitation of the coil to freewheel and/or flow through the freewheeling diode and the varistor or through a component connected in parallel with the varistor;
wherein the component includes a lower controllable semiconductor switch;
wherein a control electronics is adapted to generate an actuation signal for the upper controllable semiconductor switch and an actuation signal for the lower controllable semiconductor switch and to acquire a direct voltage and a voltage dropping at a shunt resistor as current flowing through the coil; and
wherein the control electronics is adapted to determine a wear of a brake pad of a brake pad support plate of the brake, a characteristic of a current acquired via the shunt resistor being conveyed to the control electronics, the control electronics adapted to determining a sudden change in the characteristic and a current amount during the sudden change.

* * * * *